Dec. 14, 1965     G. A. KRUG, JR     3,223,881
MAGNETRON MOUNTING STRUCTURE AND OUTPUT COUPLING
Filed Aug. 13, 1962     2 Sheets-Sheet 2
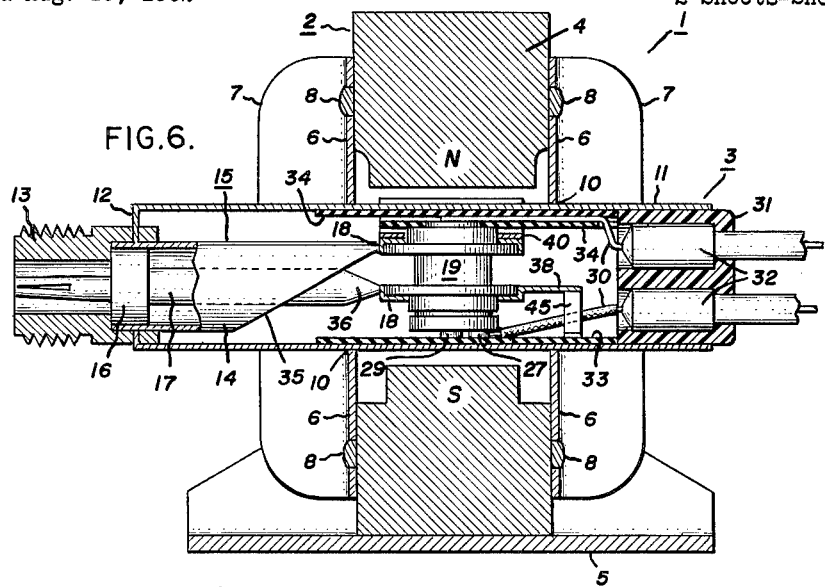
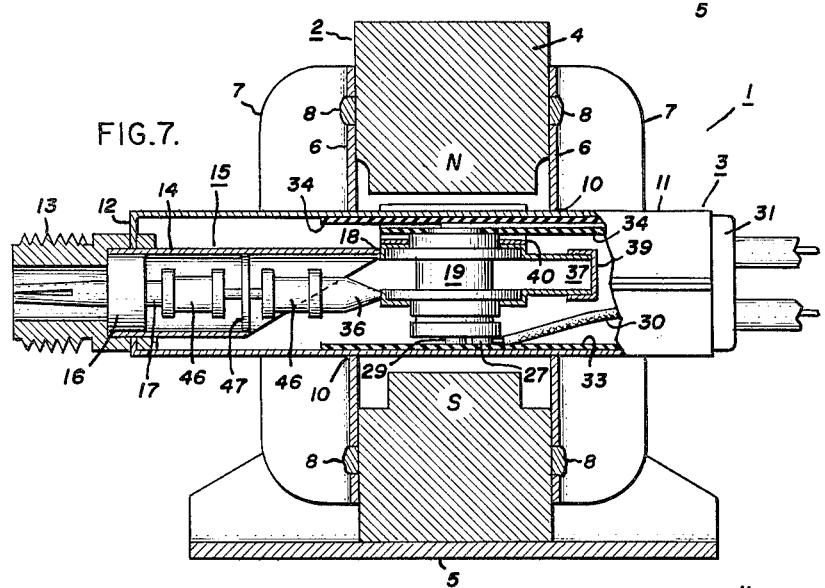
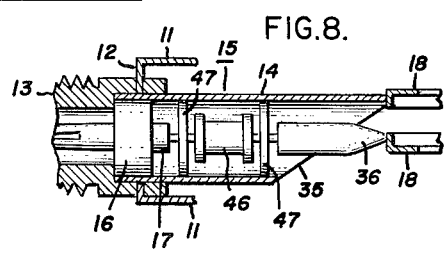
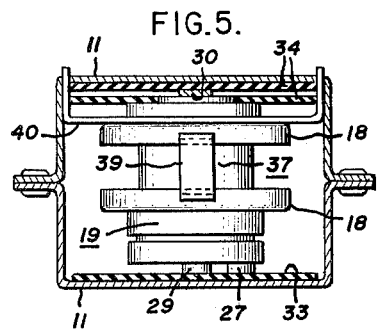
INVENTOR:
GEORGE A. KRUG, JR.
BY *Philip R. Schlam*
HIS ATTORNEY.

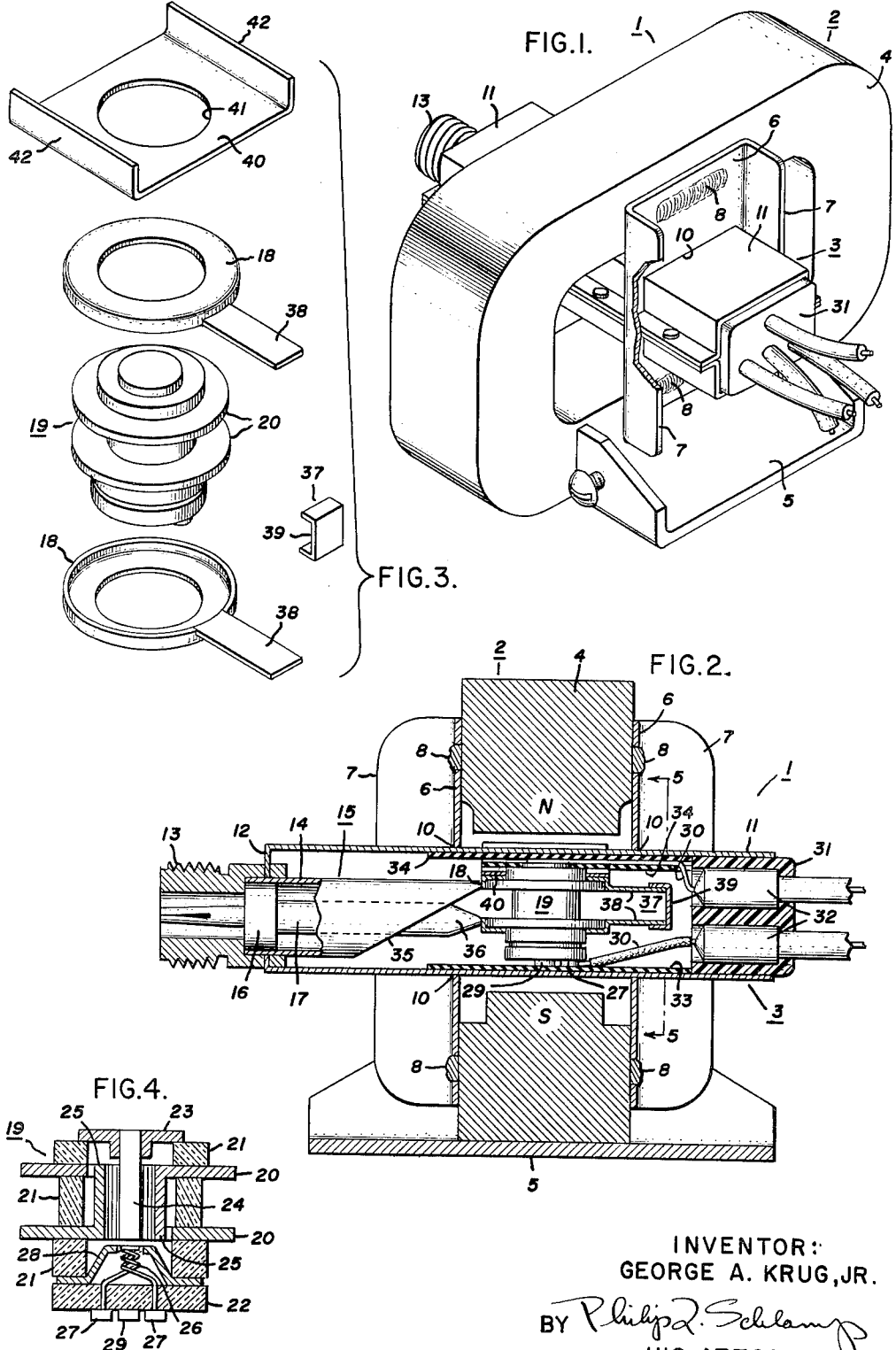

United States Patent Office 3,223,881
Patented Dec. 14, 1965

3,223,881
MAGNETRON MOUNTING STRUCTURE AND
OUTPUT COUPLING
George A. Krug, Jr., Rotterdam, N.Y., assignor to General Electric Company, a corporation of New York
Filed Aug. 13, 1962, Ser. No. 216,639
11 Claims. (Cl. 315—39)

My invention relates generally to voltage tunable magnetrons and pertains more particularly to a new and improved broadband voltage tunable magnetron package including new and improved means for effecting R.F. (radio frequency) output coupling from the voltage tunable magnetron in the package to a standard type coaxial R.F. connector.

Voltage tunable magnetron tubes are generally contained in a unitary package or structure comprising a voltage tunable magnetron tube, an R.F. circuit having the tube mounted therein, D.C. circuit means for applying appropriate operating potentials to the electrodes of the tube, and a magnet assembly providing an operating magnetic field for the tube. The magnet assembly generally comprises a permanent magnet having closely spaced opposed pole pieces defining a gap wherein a magnetic field is disposed, and the R.F. circuit wherein the tube is mounted is generally affixed to the magnet in a predetermined adjusted position in order to provide a predetermined adjusted relation between the tube and magnetic field. Additionally, it is generally necessary to provide shielding means to avoid undesirable stray R.F. radiation from the circuit and means effective to afford heat transfer outwardly from the tube to the magnet structure for dissipation thereby.

It is desirable to provide a voltage tunable magnetron package which satisfies all of the above-discussed requirements and yet is adapted for wide bandwidth high power operation, is of light weight, and is both simple and rugged in construction. Additionally, it is desirable that such a device be versatile in that it can be readily and easily modified for various applications involving, for example, different frequency ranges, operating bandwidths, power levels and load conditions. Further, it is desirable to employ in such a package a simple coaxial R.F. output connector. However, such connectors are electrically unbalanced in nature and the voltage tunable magnetron tube is essentially a balanced device. Therefore, in keeping with the purpose of providing a simple R.F. circuit operable over a wide bandwidth it is desirable to provide therein simple means for effecting a broadband balun and impedance transformation between the tube and coaxial connector, or, in other words, an electrically effective connection between the balanced and unbalanced elements in the circuit. Still further, it is desirable to provide a simply constructed voltage tunable magnetron R.F. circuit which is effective for rigidly mounting a tube therein with positive electrical connections between the circuit and tube contacts and without imposing undue strains on the vacuum seals whereby by the tube cotntacts are sealed in the tube envelope. Also, it is known that the operation of magnetron devices can be adversely affected by load mismatches or load variations. Therefore, it is desirable to provide a voltage tunable magnetron R.F. circuit adapted for rendering a device therein relatively insensitive to load mismatches or load variations. It is also desirable to provide such a circuit which will allow a voltage tunable magnetron tube therein to be operated under optimum conditions and, specifically, in a manner which will enable variations in circuit characteristics such as power output without adversely affecting other operating characteristics such, for example, as noise, linearity and power variation.

Accordingly, the primary object of my invention is to provide new and improved voltage tunable magnetron packages including new and improved R.F. circuits therein.

Another object of my invention is to provide new and improved voltage tunable magnetron R.F. circuits which are simple, of light-weight rugged construction and are particularly effective for transferring heat outwardly from a tube therein to external structure for dissipation thereby.

Another object of my invention is to provide a new and improved voltage tunable magnetron R.F. circuit including a coaxial R.F. output connector and improved means for effecting a balun connection between the unbalanced connector and a balanced voltage tunable magnetron tube in the circuit.

Another object of my invention is to provide a new and improved R.F. circuit adapted for rendering a voltage tunable magnetron tube operating therein relatively insensitive to load mismatches and load variations and for allowing the tube to operate in a manner which allows variation in certain operating characteristics without adversely affecting other operating characteristics.

Another object of my invention is to provide new and improved basic voltage tunable magnetron R.F. circuits which are versatile in that they can be readily and easily modified to adapt them for different operational requirements.

Further objects and advantages of my invention will become apparent as the following description proceeds and the features of novelty which characterize my invention will be pointed out with particularity in the claims annexed to and forming part of this specification.

In carrying out the objects of my invention I provide a unitary package assembly including a magnet structure having a spaced pair of pole pieces defining a magnet gap. Rigidly mounted on the magnet and extending between the pole pieces is a conductive box-like radiation shield. Supported in the shield is a voltage tunable magnetron R.F. circuit including a coaxial R.F. output connector rigidly mounted in one end of the shield. The connector is coupled to a section of a coaxial transmission line extending in the shield and comprising tapered inner and outer conductors effective for providing a broadband balun and impedance transformation between the connector and a voltage tunable magnetron rigidly mounted in the shield in a generally coaxial position in the magnetic field in the gap. In addition to the tapered coaxial conductors the connection includes a pair of parallel annular contacts each bonded to one of the coaxial conductors and conductively secured to an anode contact ring on the tube. An inductance loop interconnects the annular contacts on the side of the circuit opposite the coaxial transmission line. Additionally, an apertured conductive plate-like element encircles the upper end of the tube and conductively contacts the upper annular contact and the shield for the purposes of enhancing heat transfer from the tube to the shield and introducing another inductance in parallel to the first mentioned inductance for enhancing certain operating characteristics of the circuit. D.C. connections to various contacts on the tube are effected through an insulative plug extending in the end of the shield opposite the output connector, which plug can house attenuating elements for removing any R.F. currents appearing on the D.C. leads. In a second embodiment the inductance loop can be replaced by a conductor connected between the annular contact connected to the inner conductor of the transmission line and the shield whereby the shield is effectively employed in providing desired inductance in the R.F. circuit and for better assisting in the dissipation of heat generated by the tube. In a third embodiment the R.F. circuit comprises a coaxial balun connection including attenuating means located therein and whereby a tube in the circuit is adapted for operating relatively insensitive to load mismatches or variations and to better adapt the tube for optimum operations.

For a better understanding of my invention, reference may be had to the accompanying drawing in which:

FIGURE 1 is a perspective illustration of a device incorporating my invention;

FIGURE 2 is a sectional view of the device illustrated in FIGURE 1;

FIGURE 3 is an exploded perspective and enlarged view of the voltage tunable magnetron tube and circuit contact elements illustrated in FIGURE 2;

FIGURE 4 is a sectional view of a voltage tunable magnetron tube of the type employable in the circuit comprising part of the present invention;

FIGURE 5 is a sectional view taken along the lines 5—5 in FIGURE 2 and looking in the direction of the arrows;

FIGURE 6 is a sectional view of a modified form of my invention;

FIGURE 7 is a sectional view of another modified form of my invention; and

FIGURE 8 is a fragmentary sectional view of a modified form of the broadband balun impedance transformer structure illustrated in FIGURE 7.

Referring to FIGURES 1 and 2, there is shown a voltage tunable magnetron package generally designated 1 and including a magnet assembly 2 having a circuit assembly 3 mounted therein. The magnet assembly 2 includes a permanent magnet 4 of the so-called "E magnet" type which includes a pair of lateral yoke sections each connected to central pole sections which support opposed spaced pole pieces generally designated N and S. The pole pieces N and S define a magnet gap. Additionally, the magnet assembly 2 includes a mounting pad 5 suitably secured to the magnet 4. The circuit assembly 3 is a rectangular box-like structure and is securely positioned in the magnet 4 between the pole pieces N and S by a pair of mounting plates 6, each mounted on an opposite side of the magnet 4 and including a pair of parallel extensions 7 adapted for serving as heat radiating fins. Specifically, the mounting plates 6 are soldered as at 8 to the sides of the magnet 4 and are formed with apertures 10 therein. The box-like circuit assembly 3 is fitted in the apertures 10 and is suitably secured in position by brazes not shown.

The circuit assembly 3 includes a conductive shield 11 comprising a pair of opposed channel-like members formed of a non-magnetic material and including longitudinal flanges which are joined, as by riveting, for affording the mentioned box-like construction. The just-mentioned construction includes an end wall 12 seen in FIGURE 2, and suitably and rigidly mounted in the end wall 12 is a standard-type N coaxial R.F. connector 13. The outer conductor of the connector 13 is conductively connected to the end wall 12 of the shield 11 and is conductively and rigidly coupled to an outer conductor 14 of a section of coaxial transmission line generally designated 15 extending in the shield 11. The connector 13 also includes an inner conductor which is maintained coaxially positioned by a washer-like insulator 16 and which is conductively and rigidly coupled to the inner conductor 17 of the mentioned section of coaxial transmission line 15. The inner end of each of the outer and inner conductors 14 and 17, respectively, is rigidly conductively connected to an annular contact member 18. As perhaps better seen in FIGURE 3, the contact members 18 are adapted for fitting over the ends of a voltage tunable magnetron tube generally designated 19 and for making annular electrical contact with anode contacts or rings 20 provided on the tube envelope. The contact members 18 include annular outer rims which assist in providing the desired type of contact and retaining the tube in the R.F. circuit.

The magnetron tube 19 can be of the type disclosed and claimed in U.S. Patent No. 2,930,933 of G. J. Griffin, Jr. et al. issued March 29, 1960, and assigned to the same assignee as the present invention. Such a tube is illustrated in section in FIGURE 4 to bring out the relative location of electrode contacts, thereby to facilitate the description and understanding of the R.F. and D.C. circuit features of the presently disclosed structure. Briefly, and as illustrated in FIGURE 4, the tube 19 is constructed to include stacked alternate ceramic and metal elements. The ceramic elements generally include a plurality of cylindrical ceramic wall sections 21 of various axial dimensions and an apertured disk-like ceramic end cap 22. The metal members are suitably brazed to or between opposed surfaces of the ceramic elements to complete a hermetically sealed evacuated envelope and include a metal end cap 23 carrying a cylindrical non-emissive cathode 24 extending centrally in a cylindrical space defined by a plurality of anode segments generally designated 25. The anode segments 25 are arranged cylindrically in a pair of interdigital sets, with each set being carried by the inner edge of one of the mentioned anode rings 20. The anode rings 20 are each sealed between a pair of ceramic cylinders 21 and are thus mutually insulated. A filamentary emitter 26 is suitably mounted on the ceramic end cap 22, with leads sealed therethrough and connected to a pair of button-like contact members 27 bonded to the outer surface of the ceramic end cap 22. A frusto-conical control electrode 28 is sealed between one of the ceramic insulators 21 and the ceramic end cap 22 and is positioned about the emitter 26. By means of a lead (not shown) which extends also in a sealed manner through the ceramic end cap an electrical connection is made between the control electrode 28 and another button-like contact member 29 bonded to the outer surface of the ceramic end cap 22.

As mentioned above, the tube 19 requires for operation the application of suitable D.C. potentials to the various electrodes supplied through the metal end cap 23 and the contact buttons 27 and 29. These are provided through D.C. leads generally designed 30 in FIGURE 2 and extending from the mentioned contacts through a suitable connector 31 which is mounted in the end of the shield 11 opposite the R.F. output connector 13. The D.C. connector 31 can comprise a plug-like insulative element fitted tightly in the shield and can house, as by having moulded therein, suitable R.F. attenuating elements generally designated 32 and provided for removing undesired R.F. currents from the D.C. leads, which currents if permitted to appear outwardly of the shield 31 could result in the radiation of spurious signals. The attenuators 32 can be identical in structure and function to those disclosed and claimed in copending U.S. Patent application S.N. 98,045 of E. J. Cook filed March 21, 1961, now Patent No. 3,134,950, and assigned to the same assignee as the present invention.

In order to assure satisfactory electrical isolation of the tube end contacts and D.C. leads in respect to the conductive shield 11, I have provided a dielectric sheet 33 which is positioned between the contact buttons 27 and 29 of the tube and the bottom side of the shield 11 in FIGURE 2. Additionally, I have provided a pair of dielectric sheets designated 34 in FIGURE 2 which are positioned between the upper end of the tube and the upper side of the shield 11 in FIGURE 2 and have sandwiched therebetween the D.C. lead 30 connected to the metal end cap 23 on the tube. The various dielectric sheets serve the additional function of assisting in holding the tube rigidly in a position coaxial with the magnetic field and against movement under vibratory operating conditions.

In order to insure satisfactory R.F. contact between the circuit contacts 18 and the anode rings 20, I bond each contact 18 to its appropriate anode ring as by first tinning the inner surface of the contacts 18 with an appropriate bonding material and subsequently heating the assembly with the tube in the position illustrated to effect a uniform circumferential conductive bond between the circuit contacts and anode rings. This arrangement enables attachment of the R.F. circuit to the tube in a manner which provides positive contact to the tube anode rings without imposing strains on the vacuum seals between the anode rings and the ceramics.

As shown in FIGURE 2, the outer and inner conductors of the section of coaxial transmission line 15 each include tapered inner end surfaces. More specifically, the outer conductor 14 is cylindrical with an oblique surface 35 formed thereon and the inner conductor 17 is a cylindrical rod-like element with a double tapered, or wedge-shaped, inner end 36. As pointed out above, a coaxial transmission line is by nature electrically unbalanced whereas the magnetron 19 is an electrically balanced device. This necessitates the provision of a balun between the connector 13 and the tube 19, or, in other words, means adapted for effectively electrically connecting an unbalanced element to a balanced element. The section of the R.F. circuit including the tapered outer and inner conductors 14 and 17 serves effectively as a balun between the connector 13 and tube 19. Additionally, the taper 36 on the inner conductor 17 serves effectively as an impedance transformer. I have found that these functions are best served when the tapers on both the outer and inner conductors are less than about 45°.

As seen in FIGURES 2, 3 and 5, the R.F. circuit also includes a loop of conductive material generally designated 37 which is located diametrically opposite the output section of the circuit. The loop 37 can comprise a lateral extension 38 formed off each of the annular circular contacts 18 and a conductive clip 39 bonded in interconnecting relation between the extensions 48. This arrangement serves both in providing a predetermined inductance between the anode rings 20 and in maintaining the rings equipotential for D.C.

Also provided in the described package is a channel-like high heat conductivity metal element 40 which is seen best in FIGURES 3 and 5. The element 40 can be advantageously formed of copper and includes an aperture 41 whereby it is adapted for fitting over the upper end of the magnetron tube 19. Additionally, the element 40 is disposed between the upper annular contact 18 and the upper side of the shield 11. As best seen in FIGURE 5, the center section of the element 40 makes substantial area contact with the upper annular contact 18 and side sections 42 on the elements 40 both make substantial area contact with the sidewalls of the shield 11 and extend through suitable slots formed in the upper side of the shield. Additionally, the side sections 42 of the element 40 are soldered to the upper side of the shield at the slots therein for enhancing the electrical and thermal contact therebetween. This arrangement serves to assist in holding the tube rigidly in place in the shield and to afford a substantial heat path for transferring heat from the tube to the shield for dissipation. Some of this heat is dissipated by the shield and some is transferred by the mounting plates 6, seen in FIGURES 1 and 2, to the magnet for dissipation thereby.

Additionally, the element 40 introduces an inductance into the R.F. circuit through the load connected to the output connector 13. This inductance is in parallel with the inductance afforded by the inductance loop 37 and serves to improve the flatness of the power spectrum across the load.

A package constructed according to the foregoing disclosure has been operated with an R.F. power output of 1 watt minimum from 900 to 2700 megacycles with a power variation of approximately 1.5 to 1. The shielding feature of the package has been effective in preventing undesired R.F. radiation and the means for dissipating heat, including the element 40 providing a conductive heat path from the tube to the package exterior has been effective for maintaining the tube temperature within a predetermined range wherein tube operation is not adversely affected. Many of the elements comprising the package are sheet metal elements which are light weight and can be simply and inexpensively formed and assembled. As a result, the complete package is compact, light weight, rugged, mechanically simple and inexpensive to construct. Additionally, the R.F. circuit is versatile in that it can be easily adapted for special applications, such, for example, as different frequency ranges, bandwidths and power levels simply by modifying the dimensions of the several R.F. circuit elements including the internal section of the coaxial line 15 and the inductance loop 37. Such modifications can be easily accomplished without expensive and difficult machining operations. Further, and as pointed out above, the arrangement for making electrical contact between the R.F. output and anode rings is effective for providing the required contacts without imposing strains on the anode rings which could adversely affect the tube seals. Finally, and very importantly, the disclosed structure provides a relatively simple and effective combinated balun and impedance transformer which effectively couples the unbalanced coaxial connector 13 and the balanced tube 19 and provides a desired impedance match therebetween.

Illustrated in FIGURE 6 is a modified form of my invention which can be substantially identical structurally to the first embodiment shown in FIGURES 1–5 except for the absence of the inductance loop 37 provided in the first embodiment. In FIGURE 6 the elements which are identical to those of the first embodiment are identified by the same numerals. In place of the mentioned inductance loop 37 employed in the first embodiment, this embodiment includes a thermally and electrically conductive strap 45 which interconnects the lateral extension 38 on the lower R.F. circuit contact 18 to the bottom side, or lower wall, of the shield 11. This arrangement enhances the low frequency portion of the power spectrum. More specifically, it enables operation of the disclosed structure with a power output of 10 watts from 900 to 1050 megacycles, which for some applications is highly desirable. Additionally, the interconnection afforded by the strap 45 is effective for enhancing heat transfer from the tube to the shield for dissipation.

Illustrated in FIGURE 7 is another modified form of my invention. This embodiment can be substantially identical structurally to the first embodiment except for a modification of the coaxial transmission line and, in FIGURE 7, the elements which are identical to those of the first described embodiment are designated by the same numerals. More specifically, the embodiment of FIGURE 7 differs from the first described embodiment by the inclusion of an R.F. attenuating structure in the internal section of the coaxial transmission line between the coaxial connector 13 and the tube 19. The attenuating structure can advantageously comprise at least a longitudinally spaced pair of series resistors 46 an intermediate shunt resistor 47 connected suitably in the inner conductor 17 and with the shunt resistor in interconnecting relation between the inner and outer conductors of the line. More specifically, the inner conductor 17 of the present embodiment is modified by being segmented to provide for the mounting therein of the mentioned several resistor elements. If desired, more than two series resistors can be employed provided each adjacent pair of series resistors is separated by a shunt resistor. In this arrangement the resistor elements can be formed of any suitable generally commercially available material adapted for attenuating R.F. currents. Thus, the combined broadband balun and impedance transformer located between the R.F. connector 13 and the tube 19 is also adapted for attenuating R.F. current being transmitted thereby. This attenuation is effective for rendering the tube 19 relatively insensitive to load mismatches or load variations. Also, it allows the tube to operate under optimum conditions in the sense that, if desired, the power can be reduced without adversely affecting other operating characteristics such, for example, as noise, linearity and power variation.

Further, by incorporating the attenuating means in the internal section of the transmission line I have avoided the necessity of attaching an external component to the package which would substract from its compactness and ready adaptability for operating under conditions of shock and vibration and would add substantially to its weight. My construction involves the addition of relatively little weight, is internally located and thus adds to the compactness of the device and results in a rugged structure particularly suited for operating under conditions of extreme shock and vibration.

Illustrated in FIGURE 8 is a modified form of attenuating structure which can be alternatively employed in any of the previously described packages. In this embodiments the coaxial section of the transmission line can be identical to that described above. However, instead of employing pairs of spaced series resistors separated by a shunt resistor, this embodiment employs at least a pair of shunt resistors 47 with each adjacent pair separated by a series resistor 46. This arrangement is effective for accomplishing the same operational advantages discussed above with respect to the embodiment of FIGURE 7 and the resistors 46 and 47 can be identical to those employed in the embodiment illustrated in FIGURE 7.

It is to be understood from the foregoing that either of the attenuating arrangements illustrated in FIGURES 7 and 8 is applicable to any of the disclosed embodiments of my invention.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. An R.F. circuit assembly for coupling a balanced electric discharge device to a coaxial output connector, said connector comprising a section of coaxial transmission line having one end thereof conductively coupled to said connector, a spaced pair of contact members in said circuit adapted to contact said device, the other end of said line having the outer and inner conductors thereof each conductively coupled to one of said spaced contact members, and said outer and inner conductors being tapered at the ends thereof coupled to said spaced contact members, the inner conductor having a double taper at the coupling end thereof and the outer conductor having a single taper at the coupling end thereof, and an inductance loop connected to at least one of said contact elements.

2. An R.F. circuit according to claim 1, wherein said coaxial transmission line contains R.F. attenuating means.

3. A R.F. circuit for coupling a balanced electric discharge device including a spaced pair of contact rings to a coaxial output connector comprising a section of coaxial transmission line having one end thereof conductively coupled to said connector and the ends of each the outer and inner conductors thereof opposite said output connector conductively coupled to one of said contact rings, said inner and outer conductors being tapered at the ends thereof and conductively coupled to said rings, and said transmission line including R.F. attenuating means comprising series resistance means interposed in said inner conductor and shunt resistance means interconnecting said inner and outer conductors.

4. An R.F. circuit according to claim 3, wherein said R.F. attenuating means comprises at least a pair of series resistors and an interposed shunt resistor.

5. An R.F. circuit according to claim 3, wherein said R.F. attenuating means comprises at least a pair of shunt resistors and an interposed series resistor.

6. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnet field in said gap and including a spaced pair of contact members, and an output R.F. circuit for said tube comprising a coaxial transmission line having one end thereof rigidly conductively coupled to said connector and extending in said shield, the other end of said transmission line having the outer and inner conductors thereof each conductively coupled to one of said tube contact members, and said outer and inner conductors being tapered at the ends thereof coupled to said tube contact members.

7. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnetic field in said gap and including a spaced pair of anode contact rings, an R.F. output circuit for said tube comprising a coaxial connector mounted rigidly in one end of said shield, a section of coaxial transmission line having one end thereof rigidly conductively coupled to said connector and extending in said shield, each the inner and outer conductors of said transmission line having an annular contact on the inner end thereof making circumferential electrical and thermally conductive contact with one of said anode rings, each said outer and inner conductors being tapered at the end adjacent said tube, and an inductance loop in said shield electrically interconnecting said annular circuit contacts on the sides thereof opposite said coaxial line.

8. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnetic field in said gap and including a spaced pair of anode contact rings, an R.F. output circuit for said tube comprising a coaxial connector mounted rigidly in one end of said shield, a section of coaxial transmission line having one end thereof rigidly conductively coupled to said connector and extending in said shield, each the inner and outer conductors of said transmission line having an annular contact on the inner end thereof making circumferential electrical and thermally conductive contact with one of said anode rings, each said outer and inner conductors being tapered at the end adjacent said tube, and a thermally conductive member making annnular intimate contact with said annular contact on said outer conductor of said transmission line, said conductive member fitting over the corresponding end of said tube and engaging the corresponding wall of said shield for assisting in holding said tube in position, effecting a substantial heat path from said tube to said shield and introducing a predetermined inductance in said R.F. circuit.

9. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnetic field in said gap and including a spaced pair of anode contact rings, an R.F. output circuit for said tube comprising a coaxial connector mounted rigidly in one end of said shield, a section of coaxial transmission line having one end thereof rigidly conductively coupled to said connector and extending in said shield, each the inner and outer conductors of said transmission line having an annular contact on the inner end thereof making circumferential electrical and thermally conductive contact with one of said anode rings, each said outer and inner conductors being tapered at the end adjacent said tube, and an electrically and thermally conductive element conductively interconnecting the annular contact on said inner conductor of said transmission line and the wall of said shield.

10. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnetic field in said gap and including a spaced pair of anode contact rings, an R.F. output circuit for said tube comprising a coaxial connector mounted rigidly in one end of said shield, a section of coaxial transmission line having one end thereof rigidly conductively coupled to said connector and extending in said shield, each the inner and outer conductors of said transmission line having an annular contact on the inner end thereof making circumferential electrical and thermally conductive contact with one of said anode rings, each said outer and inner conductors being tapered at the end adjacent said tube, an inductance loop in said shield electrically interconnecting said annular circuit contacts on the sides thereof opposite said coaxial line, and a thermally conductive member making annular intimate contact with said annular contact on said outer conductor of said transmission line, said conductive member fitting over the corresponding end of said tube and engaging the corresponding wall of said shield for assisting and holding said tube in position, effecting a substantial heat path from said tube to said shield and introducing a predetermined inductance in said R.F. circuit in parallel with the inductance afforded by said inductance loop.

11. R.F. apparatus comprising a magnet structure including a pair of opposed spaced pole pieces defining a gap, a hollow R.F. shield positioned in said gap and secured to said magnet in rigid heat conducting relation, a magnetron tube rigidly positioned in said shield in generally coaxial position relative to a magnetic field in said gap and including a spaced pair of anode contact rings, an R.F. output circuit for said tube comprising a coaxial connector mounted rigidly in one end of said shield, a section of coaxial transmission line having one end thereof rigidly conductively coupled to said connector and extending in said shield, each the inner and outer conductors of said transmission line having an annular contact on the inner end thereof making circumferential electrical and thermally conductive contact with one of said rings, each said outer and inner conductors being tapered at the end adjacent said tube, and R.F. attenuating means located in said section of said transmission line and comprising series resistance means interposed in said inner conductor and shunt resistance means interconnecting said inner and outer conductors.

References Cited by the Examiner

UNITED STATES PATENTS

| | | | |
|---|---|---|---|
| 2,477,317 | 7/1949 | Spencer | 315—39.53 X |
| 2,534,503 | 12/1950 | Donal et al. | 315—39.53 X |
| 2,580,988 | 1/1952 | Anderson | 315—39.53 X |
| 2,930,933 | 3/1960 | Griffin et al. | 315—39.57 X |

GEORGE N. WESTBY, *Primary Examiner.*

ROBERT SEGAL, *Examiner.*